2,977,338
RESINOUS COMPOSITION AND PROCESS OF PREPARING SAME

John C. Petropoulos, Norwalk, Conn., assignor to American Cyanamid Company, New York, N.Y., a corporation of Maine No Drawing. Filed Aug. 4, 1958, Ser. No. 753,128

4 Claims. (Cl. 260—47)

This invention relates to a novel group of polymeric materials and to the process of preparing the same. More particularly, this invention relates to a novel class of polymeric materials produced by reacting a butylidene bis-benzoic acid with the diglycidyl ether of 4,4'-isopropylidene diphenol.

One of the objects of the present invention is to produce a novel resinous material which is hard, tough, clear and transparent by reacting a butylidene bis-benzoic acid with a diglycidyl ether of 4,4'-isopropylidene diphenol. A further object of the present invention is to produce polymeric materials that will have utility in the fields of molding, casting and laminating. These and other objects of the present invention will be discussed in greater detail hereinbelow.

This application is a continuation-in-part of my earlier application having the Serial No. 523,355 filed July 20, 1955, entitled "4,4'-(2,2-Butylidene)Dibenzoic Acid," now Patent No. 2,848,486, issued August 19, 1958.

In the preparation of the resinous materials of the present invention, one makes use of a butylidene dibenzoic acid of the class disclosed in my parent application. Among the butylidene bis-benzoic acids which may be used in the practice of the present invention are 4,4'-(2,2-butylidene)dibenzoic acid; 3,3' - (2,2 - butylidene)dibenzoic acid; 2,2'-(2,2-butylidene)dibenzoic acid, and the like.

The diglycidyl ether of 4,4'-isopropylidene diphenol, sometimes referred to as Bis Phenol A, is the other essential reactant in the preparation of the novel resinous materials of the present invention. In reacting said 4,4'-isopropylidene diphenol with a butylidene bis-benzoic acid, stoichiometrical quantities of the materials may be used. This means that for practical purposes, about 1 mol of the ether is used per mol of the bis-benzoic acid. Since the epoxy groups of the diglycidyl ether of the 4,4'-isopropylidene diphenol react with the bis-benzoic acid to form hydroxy ester groups, the reaction is fundamentally an esterification reaction. In order to insure substantially complete esterification of the bis-benzoic acid, it is generally desired to use a slight excess of the diglycidyl ether such as about 5% or 10% or more over and beyond the stoichiometrical amounts required to produce substantially complete esterification.

The practice of the process of the present invention may be carried out in the presence of an inert solvent or the process may be carried out in the complete absence of any solvent. No catalytic agents are required to cause the esterification to take place but alkaline agents may be used to catalyze the reaction. Among the catalysts which may be used are alkali metal hydroxides such as sodium hydroxide or acetates such as potassium acetate and tertiary amines. The temperature at which the heating is carried out is not critical although elevated temperatures are desired. The reaction at room temperature would be so slow as to make it commercially unfeasible. Temperatures from about 100° C. to the reflux temperature of the reaction mix may be used. It is preferred, however, to utilize temperatures between about 160 and 200° C. If a solvent system is to be utilized, any of the conventional solvents, particularly the inert organic solvents, may be used.

In order that the concept of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

Example 1

60 parts of the diglycidyl ether of 4,4'-isopropylidene diphenol and 48 parts of 4,4'-(2,2-butylidene)dibenzoic acid are blended together and heated to 180° C. in a period of about 20 minutes with constant stirring. The charge is then held at about 180-185° C. for about 20 minutes more with constant stirring. A sample of the resin thus prepared is placed in a heated oven at 185° C. for about 1 hour. The product thus produced showed a Barcol hardness of 10 and the material was hard, tough, clear and transparent.

Comparative Example 2

Example 1 is repeated in every detail except that in the place of the 48 parts of the 4,4'-(2,2-butylidene)dibenzoic acid, there is used an equivalent amount, namely, 45.5 parts of 4,4'-isopropylidene dibenzoic acid. The ultimate product produced after the oven treatment was too friable and crumbled readily. As a consequence, a Barcol hardness test could not be applied to this resultant product. Furthermore, the sample produced was opaque.

Example 3

Example 1 is repeated in every detail except that after the heating at 180° C. with constant stirring for 20 minutes, the charge was held at 190° C. for 15 minutes and then placed in an oven for 50 minutes at 215° C. The resultant sample was clear, hard and transparent.

Comparative Example 4

Example 3 is repeated in every detail except that in the place of the 48 parts of the butylidene acid, there is used an equivalent amount, namely, 45.5 parts of 4,4'-isopropylidene dibenzoic acid. The resulting product was opaque.

Example 5

Example 1 is repeated in all details except that the blend of reactants is heated in 15 minutes with constant stirring to 190° C. and in an additional 3 minutes to 200° C. The resultant product was clear and pourable and was poured into a preheated mold at 180° C. and cured at that temperature for 2 hours followed by a post-curing at 145° C. for 15 hours. The resultant product was a clear, hard casting.

Comparative Example 6

60 parts of the diglycidyl ether of 4,4'-isopropylidene diphenol are blended with 45.5 parts of 4,4'-isopropylidene dibenzoic acid and the mix is heated to 190° C. in 15 minutes with constant agitation. The mixture was still opaque and heterogeneous so that heating was continued to a temperature of about 200° C. for an additional 8 minutes. Recognizing the desirability of eliminating the opacity, but fearing premature gelation, the charge is poured into a preheated mold at 180° C. and cured at that temperature for 2 hours followed by post-curing at 145° C. for 15 hours. The resulting product was an opaque casting.

*Example 7*

Example 1 is repeated in all details except that the blend is heated to 190° C. in 18 minutes to produce a product which was clear and pourable. The product was poured into a preheated mold at 210° C. and cured at that temperature for 1 hour and then post-cured for 15 hours at 145° C. The resultant casting was clear and transparent.

*Comparative Example 8*

Example 7 is repeated in all details except that after the heating to 190° C. in 18 minutes, the resultant mass being still opaque was heated to 210° C. in 7 minutes. The product was still fluid but opaque. The product was then divided into two portions, one of which was poured into a preheated mold at 210° C. and cured at 210° C. for 1 hour and then post-cured for 15 hours at 145° C. The resultant product was opaque. The second portion that had been heated to 210° C. in a total of 25 minutes was heated additionally at 210° C. for an additional 9 minutes with constant stirring. The resultant product was still opaque but became unpourable and gelled in the reaction vessel.

I claim:

1. The polymeric resinous reaction product of an unsubstituted butylidene bis-benzoic acid and the diglycidyl ether of 4,4'-isopropylidene diphenol wherein the diglycidyl ether in said polymeric resinous reaction product is present in an amount varying from about equimolar quantities up to about 10% in excess of the stoichiometrical amount required to produce substantially complete esterification with respect to said butylidene acid.

2. The polymeric resinous reaction product of 4,4'-(2,2-butylidene)dibenzoic acid and the diglycidyl ether of 4,4'-isopropylidene diphenol wherein the diglycidyl ether in said polymeric resinous reaction product is present in an amount varying from about equimolar quantities up to about 10% in excess of the stoichiometrical amount required to produce substantially complete esterification with respect to said butylidene acid.

3. A process comprising heat reacting at a temperature between about 100° C. and reflux temperature an unsubstituted butylidene bis-benzoic acid and the diglycidyl ether of 4,4'-isopropylidene diphenol wherein said diglycidyl ether is present in an amount from about equimolar quantities up to about 10% in excess of the stoichiometrical amounts required to produce substantially complete esterification with respect to said butylidene acid.

4. A process comprising heat reacting at a temperature between about 100° C. and reflux temperature 4,4'-(2,2-butylidene)dibenzoic acid and the diglycidyl ether of 4,4'-isopropylidene diphenol wherein said diglycidyl ether is present in an amount from about equimolar quantities up to about 10% in excess of the stoichiometrical amounts required to produce substantially complete esterification with respect to said butylidene acid.

References Cited in the file of this patent

UNITED STATES PATENTS

| | | |
|---|---|---|
| 2,634,251 | Kass | Apr. 7, 1953 |
| 2,686,164 | Arvin | Aug. 10, 1954 |
| 2,698,308 | Crecelius | Dec. 28, 1954 |
| 2,720,505 | Caldwell | Oct. 11, 1955 |
| 2,794,822 | Schweitzer | June 4, 1957 |